(12) United States Patent
White (10) Patent No.: US 9,500,310 B2
(45) Date of Patent: Nov. 22, 2016

(54) NON-ROTATING COUPLING DEVICE

(76) Inventor: Davis A. White, Summerton, SC (US)

(*) Notice: Subject to any disclaimer, the term of this patent is extended or adjusted under 35 U.S.C. 154(b) by 543 days.

(21) Appl. No.: 13/404,318

(22) Filed: Feb. 24, 2012

(65) Prior Publication Data

US 2012/0160932 A1    Jun. 28, 2012

Related U.S. Application Data

(63) Continuation of application No. 11/967,388, filed on Dec. 31, 2007.

(60) Provisional application No. 60/897,883, filed on Jan. 29, 2007.

(51) Int. Cl.
| | |
|---|---|
| *F16L 37/23* | (2006.01) |
| *B05B 15/06* | (2006.01) |
| *F16L 37/22* | (2006.01) |
| *B05B 1/00* | (2006.01) |
| *B05B 1/12* | (2006.01) |

(52) U.S. Cl.
CPC ............ *F16L 37/23* (2013.01); *B05B 1/005* (2013.01); *B05B 15/065* (2013.01); *F16L 37/22* (2013.01); *B05B 1/12* (2013.01)

(58) Field of Classification Search
CPC .......... F16L 27/23; F16L 37/22; B05B 1/12; B05B 1/005; B05B 15/065
USPC ................ 285/308, 316, 317, 318; 137/614, 137/614.04, 614.05, 614.06; 239/225.1
See application file for complete search history.

(56) References Cited

U.S. PATENT DOCUMENTS

| | | | | | |
|---|---|---|---|---|---|
| 2,665,928 | A | * | 1/1954 | Omon | F16L 37/23 137/614.04 |
| 4,014,467 | A | * | 3/1977 | Ferguson | A47L 15/16 134/179 |
| 4,366,945 | A | * | 1/1983 | Blauenstein | F16L 37/22 251/149.6 |
| 4,437,647 | A | * | 3/1984 | Cruse | F16L 37/23 251/149.9 |
| 4,543,993 | A | * | 10/1985 | Calvin et al. | 137/614.03 |
| 5,540,250 | A | * | 7/1996 | Mullins | F16L 55/1015 137/75 |
| 6,511,100 | B1 | * | 1/2003 | Le Clinche | F16L 37/23 285/314 |
| 2005/0093297 | A1 | * | 5/2005 | Gilpatrick et al. | 285/316 |

\* cited by examiner

*Primary Examiner* — Gregory Binda
*Assistant Examiner* — Zachary Dragicevich
(74) *Attorney, Agent, or Firm* — Nexsen Pruet, LLC; Michael A. Mann (57) ABSTRACT

The invention is a quick connect and disconnect coupling system which limits the free rotation between the female socket and the male plug of the coupling with respect to one another. It comprises a male plug having a coupling end and a female socket having a coupling end with a receiving opening therein to receive the coupling end of the male plug when the connectors are in a coupled condition. A holding mechanism is associated with the coupling end. The male plug includes a non-circular surface that inter-engages the locking balls within the female quick connect socket to substantially prevent relative rotation of the male plug in relation to the female socket. The coupling is particularly useful for attaching accessories for fluid dispensing as used in highly pressurized spray applications to allow the ability to rotationally adjust the dispensing action.

13 Claims, 12 Drawing Sheets

NON-ROTATING COUPLING DEVICE

CROSS REFERENCE TO RELATED PATENTS

This application is a continuation of U.S. non-provisional patent application Ser. No. 11/967,388 filed Dec. 31, 2007, and now abandoned herewith. Priority is claimed to U.S. Provisional application No. 60/897,883 filed Jan. 29, 2007.

BACKGROUND OF THE INVENTION

The present invention is in the field of quick connect couplers.

Quick connect couplers are well known and commonly used in connecting air powered tools to highly pressurized spraying systems. Quick connect couplers allow a user to merely push two portions of the coupler together to connect a fluid or gas line. Numerous types of quick connect couplers exist in the art. These couplers are usually designed to be freely rotatable around a center axis. The problem with such couplers is that there exist applications where minimal, or no rotatable action is desired. In some dispensers, for example, accessories exist that require the user to rotate the nozzle in order to adjust the spray pattern. Traditionally configured couplers do not allow the convenient use of such accessories in a quick connect configuration due to the fact that the coupler will rotate freely, thus not providing the resistance necessary to adjust the accessory and requiring the operator to use two hands, one to hold the work piece in position and the other to adjust the controls. Another example would be in a sprinkler system using rotating sprinkler heads, such as impact heads. The base of such heads has to be held against a rotation so that the sprinkler head will rotate as desired. If the coupler and the base of the sprinkler head are free to rotate, the sprinkler may stay in substantially one position with the sprinkler head base moving back and forth. Another example would be when connecting hose lines in pneumatic or hydraulic applications. There exist instances where it is required to orient the connector in such a manner and have it remain in the intended rotational position. Examples include the use of in-line pressure gauges, venturi valves, and other auxiliary pieces. Traditionally configured couplers do not allow the user to orient the connector in such a manner because the hose or accessory would freely self-adjust to its most natural position being influenced by the weight of gravity or the twisting influence of a hose line. Another example would be when it is required to open or close a shut-off valve after the coupler is engaged or before it is disengaged, as is the case with some industrial and medical hose lines. Once connected the coupler is rotated to open the nipple valve and allow flow.

These quick connect couplers have been known in the art for a long time and some attempts have been tried over the years to stop the natural rotation. These attempts are usually designed in such a way that require changes to both the male and female portions of the coupler, thus making them not compatible with the standard mating piece on the market. That is to say, the male portion of the recently improved components may be compatible with a standard female socket, but the features that prevent rotation may not be functional. Thus, it is desirable to provide a quick connect coupler that limits rotation and is backwards compatible with traditional configured couplers while still maintaining its additional function of rotation limitation. It is in this light that the present invention seeks to limit rotation through implementation of an improved quick connection device that interacts with the common feature of a traditional mating coupler piece in order to achieve limited rotational movement.

SUMMARY OF THE INVENTION

The present invention comprises a quick connect and disconnect coupling system which includes a respective male and female fittings having respective interlocking portions which prevent relative rotation there between in the coupled condition and a dispensing accessory. The coupling is particularly useful for applications wherein free rotation of the ends of the coupler is undesirable such as for connecting accessories such as spraying devices that require rotary action to adjust the dispensing action.

The quick connect and disconnect coupling system includes a male plug having a coupling end and an attachment end and a female socket having a coupling end with a receiving opening to receive the coupling end of the male plug. A locking mechanism is associated with and cooperable between the male plug and the female socket to secure the coupling end of the male plug when the coupling end of the male plug is inserted into the receiving opening and to release the coupling end of the male plug from the receiving opening when desired to disconnect the male plug from the female socket. The male plug includes a male component and an annular groove with integrated longitudinal ridge that engages the locking mechanism on the female socket to prevent relative rotation of the male plug and the female socket when the connectors are in a coupled condition. Such interlocking or engaging surfaces may take the form of one or more ridges extending radially from the ball receiving recess in the coupling end of the male plug to mate with at least one retaining ball located in the female socket of the locking mechanism.

The holding mechanism may include at least one ball retaining hole through the coupling end of the female socket with a ball positioned in at least one ball retaining hole. A sleeve having a first inside diameter portion and a tapered portion extending from the first diameter portion to a larger diameter portion is slidably mounted on the coupling end of the female socket over at least one ball retaining hole so that the first diameter portion or tapered portion may be selectively aligned with at least one ball retaining hole so that the first diameter portion or tapered portion may be selectively aligned with the at least one ball retaining hole. When the first diameter portion is aligned with the at least one ball retaining hole, it holds the ball in the at least one ball retaining hole in an inward position wherein the ball extends into the receiving opening. When the tapered portion of the larger diameter portion is aligned over the at least one ball retaining hole it allows the ball in the at least one ball retaining hole to move to an outward position of the receiving opening. A spring biases the sleeve to a biased position wherein the first diameter portion is aligned with the at least one ball retaining hole. A ball receiving recess in the coupling end of the male plug, receives the ball in the at least one ball retaining hole when the coupling end of the male plug is received in the receiving opening of the female socket. The male and female couplers are held together by holding the ball in the at least one ball retaining hole in inward position to extend into the ball receiving recess.

One of the primary characteristics of the improved quick connect coupler system is that only one portion of the coupler system, namely the male plug, has an improved design. The improvement applied to the male plug is intended to function within the existing design of the traditional female socket. That is, by to say that each of both the female and male couplers are interoperable with or without the improvement, thereby ensuring backwards compatibility with the traditional or non-improved designs.

Further objects and advantages of the invention will become apparent from a consideration of the drawings and ensuing detailed description.

DETAILED DESCRIPTION OF THE DRAWINGS

Brief description for carrying out the invention is illustrated in the accompanying drawings, in which.

DETAILED DESCRIPTION OF THE INVENTION

It is to be understood by one of ordinary skill in the art that the present discussion is a description of exemplary embodiments only, and is not intended as limiting the broader aspects of the present invention. The following exemplary embodiment is provided to further illustrate the invention and is not to be construed to unduly limit the scope of the invention.

Figure 1A:
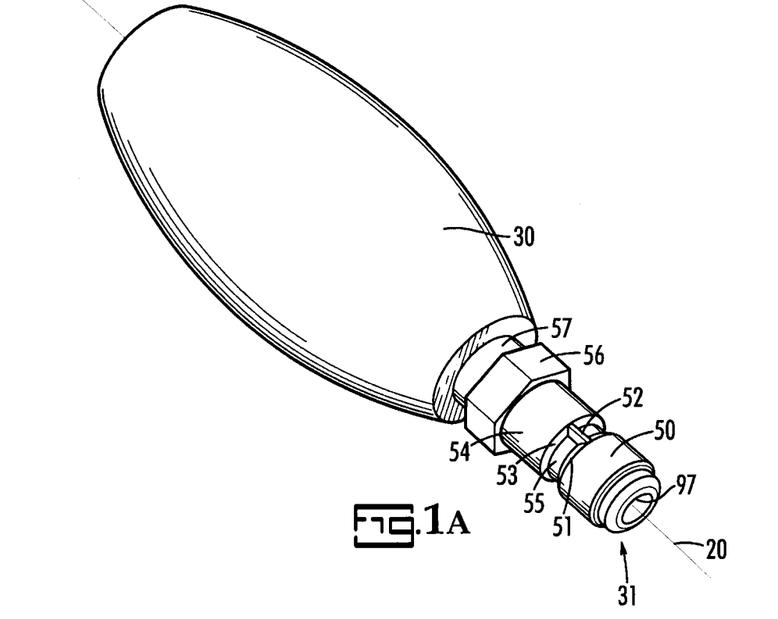
FIG. 1A is a perspective view of a male quick connect plug attached to a dispensing accessory implementing an embodiment of the non-circular surface, or ridge, located between the ball engagement surface and the backwardly rising surface, thus bridging the two surfaces.
Figure 1B:
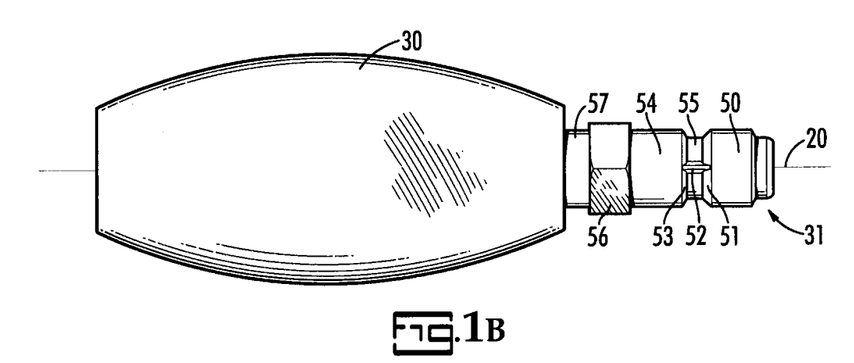
FIG. 1B is a side elevation view of the same male quick connect plug.
Figure 1C:
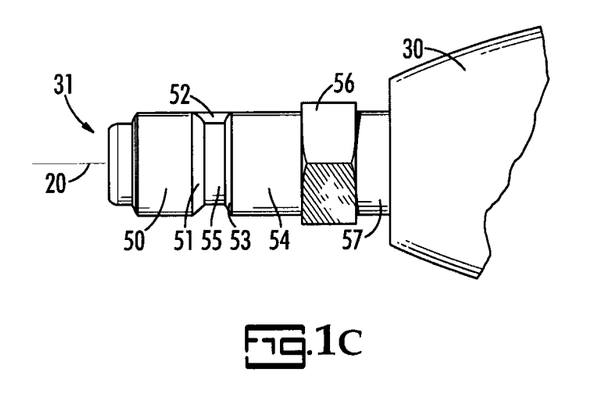
FIG. 1C is a side view of the same male quick connect plug.
Figure 2:
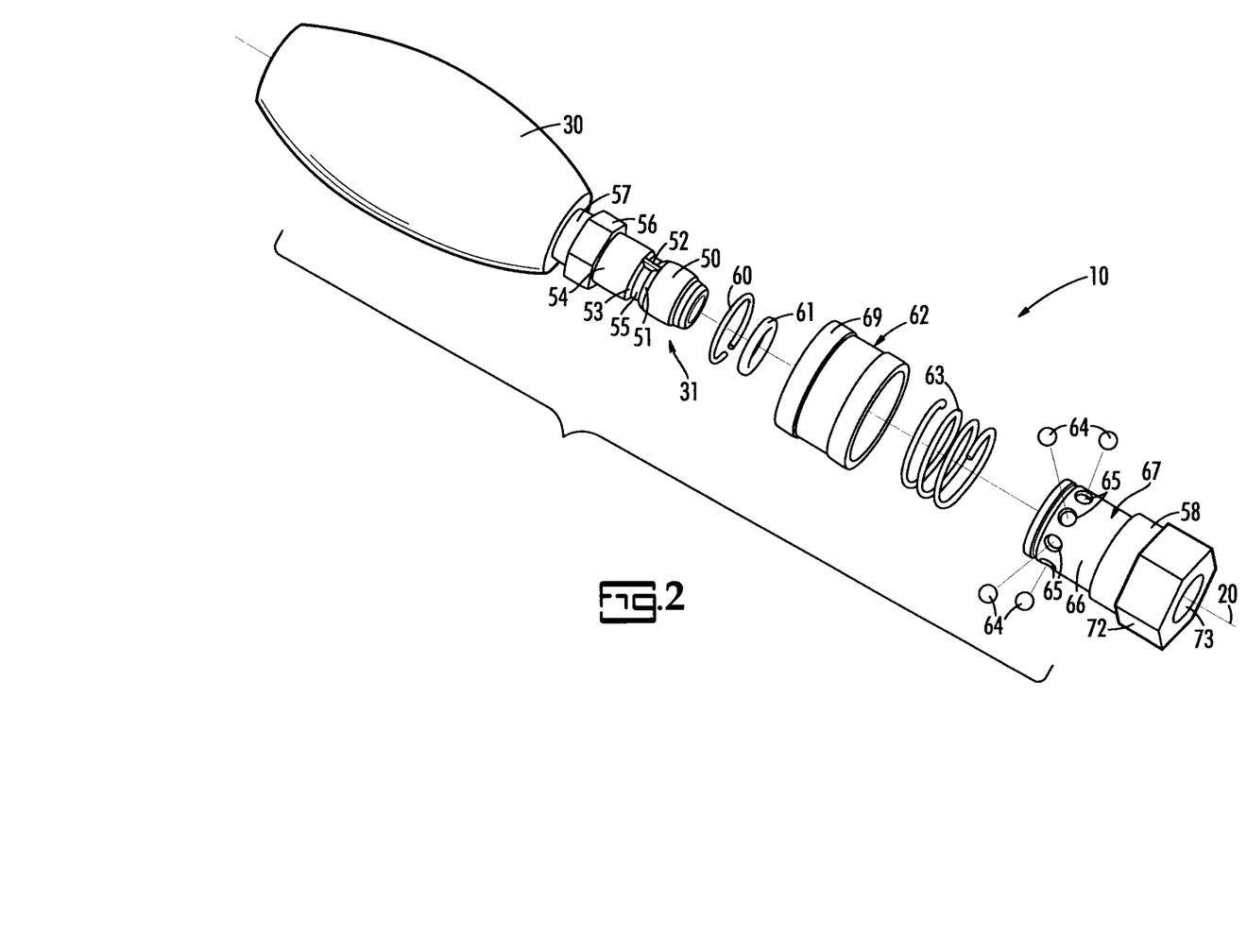
FIG. 2 is an exploded perspective view of a male quick connect plug attached to a dispensing accessory and a female quick connect socket assembly.
Figure 3A:
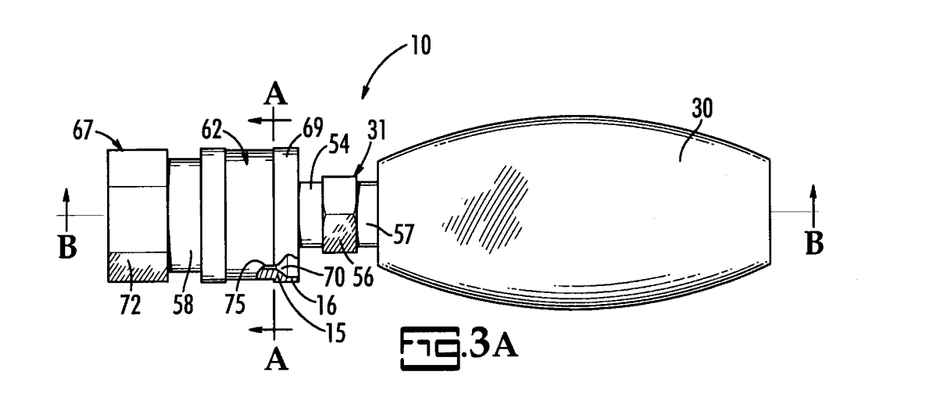
FIG. 3A is a side view of a male quick connect plug attached to a dispensing accessory and a female quick connect socket assembly.
Figure 3B:
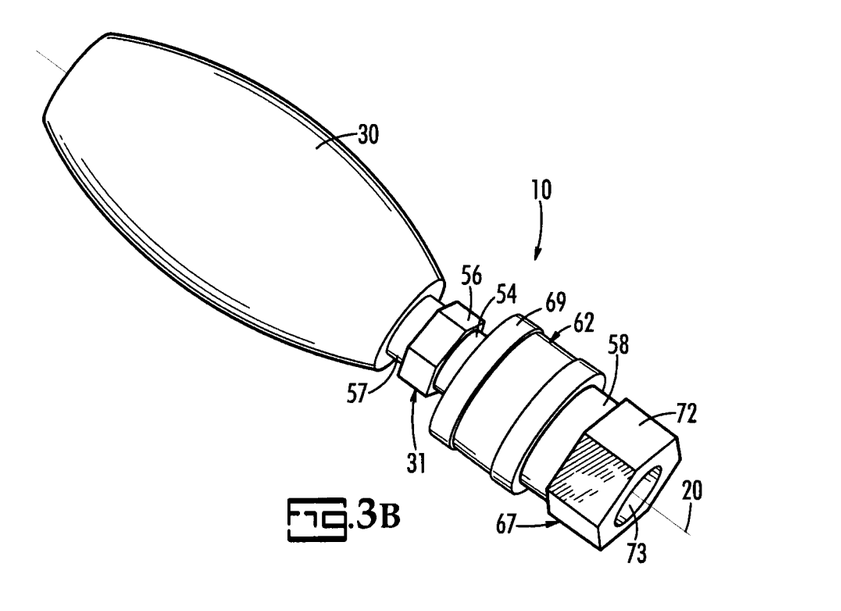
FIG. 3B is a perspective view of the same dispensing accessory attached to a female quick connect socket assembly.

Referring to FIGS. 2, 3A and 3B, the non-rotating quick connector 10 comprises a male connector 31, a female connector 67, a tubular sleeve 62, a compression spring 63, a lock ring 60, O-rings 61 and one or more locking balls or pins 64.

Male connector 31 includes an internally or externally threaded portion 57 forming an attachment end integrally connected to a male plug or coupling portion or end 50 by means of a shoulder portion 54 intermediate the length of the connector 31. Male plug 50 has an annular surface and further includes a fluid or air channel 97 which extends either partially or completely through the male connector 31, at least one selectively annular retaining ball groove 55 about coupling portion 50, and one or more ridges 52 purposely positioned generally longitudinal along axis 20 and extending between forwardly angled ball retention inclined surface 51, across annular groove 55 and interconnecting to backwardly angled inclined surface 53, ridge 52 thereby extending longitudinally and radially within groove 55. Male connector 31 further includes a hexagonally or otherwise flattened sided shaped gripping surface 56. A highly pressurized sprayer attachment accessory 30 is shown attached to the male connector 31, as an example, but may comprise other forms or configurations. There exist other configurations of male plug designs that incorporate single shut-off, double shut-off and straight-through configurations which all could apply to the present invention.

Female connector 67 comprises an externally or internally threaded portion 73 forming an attachment end integrally connected to a female quick connect socket portion 66 by means of a shoulder portion 58. Female connector 67 further comprises a hexagonally or otherwise flattened sided shaped gripping surface 72. Female connector 67 further includes a water of air channel 71 (FIG. 7) which extends partially or completely through female connector 67, one or more tapered ball or pin recesses 65 extending through female socket portion 66, and internal o-ring grooves (not shown) inside a shoulder portion (not shown). There exist other configurations of female socket designs that incorporate single shut-off, double shut-off and straight-through configurations which all could apply to the present invention.

Sleeve 62 includes an annular internal shoulder 15 having an annular tapered portion 70, an axially flat annular portion 81 and a radially flat annular portion 75, and also includes an annular exterior gripping surface 69. Lock ring 60 is secured in annular lock ring groove 68 during assembly after sleeve 62 is slid over female coupling portion 66 with balls or pins 64 in recesses 65. There exist other configurations of quick connect sleeve assemblies of which this invention would apply.

Compression spring 63 biases sleeve 62 against lock ring 60 and comprises a piece of wire wound around one or more turns at such a radius as to closely fit about female socket portion 66 of female socket 67. There exist other configurations of quick connect spring assemblies of which this invention would apply.

Locking rings 60, O-rings 61 and retaining balls or pins 64 are of standard construction known in the fluid and air flow industries, as is the construction of the ball or pin retaining recess 65 to retain balls or pins 64 therein. There exist other configurations of quick connect locking and O-ring assemblies of which this invention would apply.

Figure 7:
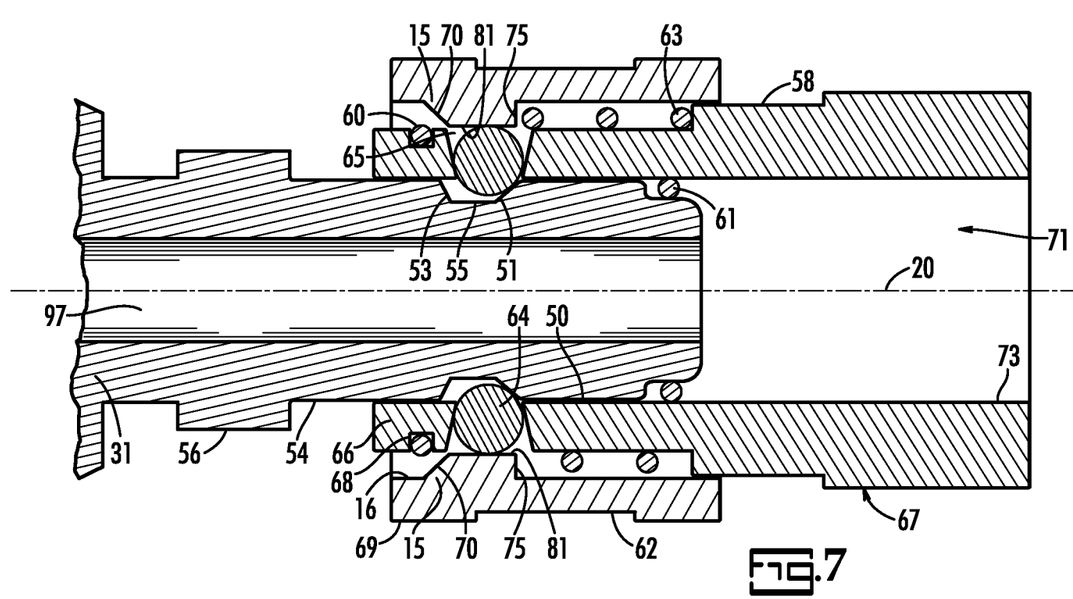
FIG. 7 is a transverse sectional view taken through plane A-A of FIG. 3A.

Female socket portion 66, sleeve 62, compression spring 63, lock rings 60, O-rings 61 and retaining balls or pins 64 fit together as shown in FIGS. 7, 3A and 3B. Spring 63 is disposed about female socket portion 66 of female connector 67 with sleeve 62 disposed thereabout, retaining balls or pins 64 being retained within respective retaining recesses 65 by internal shoulder 15 of sleeve 62. Sleeve 62 is retained on female connector 67 by means of lock rings 60, which are secured in annular lock ring groove 68 about female socket portion 66 and abut internal shoulder 15 of sleeve 62 as sleeve 62 is biased by spring 63 to a forward locking position. When in locking position, retaining balls or pins 64 are retained in an inwardly biased position by contact with axially flat annular portion 81 of sleeve 62 so as to partially extend into the media channel 71. When sleeve 62 is manually influenced against the bias of spring 63 to a rearward position by engagement between the spring and radially flat annular portion 75, balls or pin 64 are disposed adjacent annular tapered portion 70 or larger diameter annular portion 16 of sleeve 62, which permits balls or pins 64 to move radially outwardly so as to be removed from inside media channel 71. O-rings 61 are disposed within respective O-ring grooves (not shown).

Figure 6:
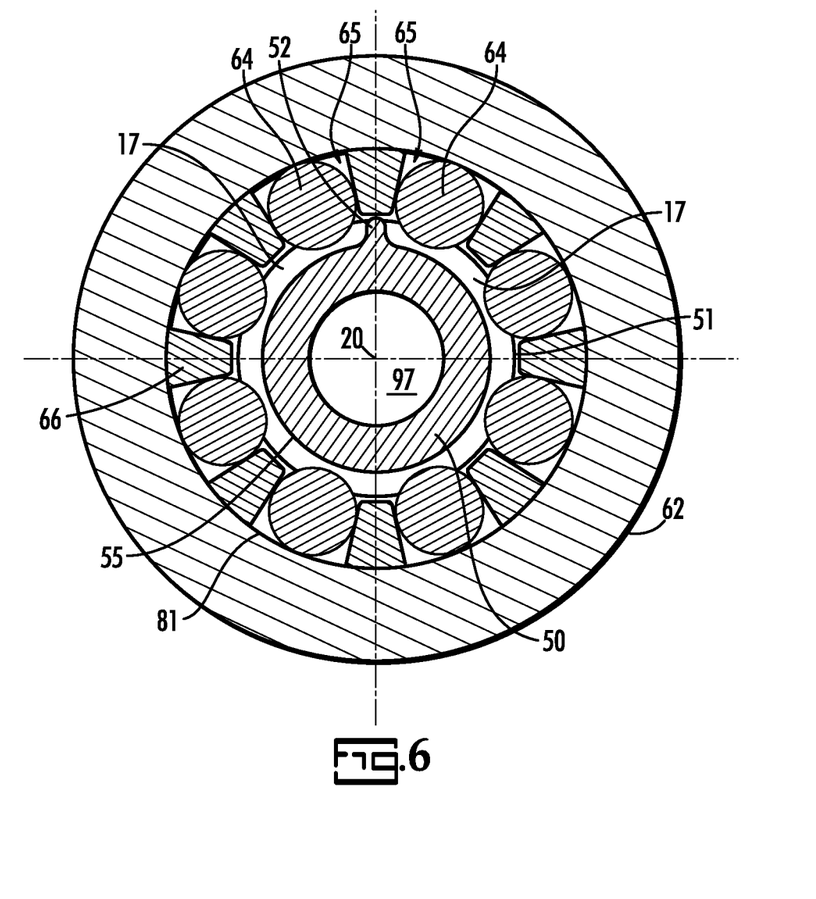
FIG. 6 is a lateral sectional view of FIG. 3A showing an anti-rotation ridge on the male plug and engagement surfaces of the female socket.

Male and female connectors 31 and 67 removably couple together by forcing sleeve 62 to the rearward position against the bias of spring 63 such that retaining balls or pin 64 can clear the media channel 71 when the male coupling portion 50, which fits closely in media channel 71, is moved into position in media channel 71. When male and female connectors 31 and 67 are rotated relative to one another to the proper position or otherwise interconnected, anti-rotation ridge or ridges 52 each fit into a region 17 between two adjacent retaining balls or pins 64, the respective surfaces thereof on opposite sides of region 17 being thereby engageble by ridge 52 as shown in FIG. 6 to prevent such relative rotation. Male coupling portion 50 is moved into the opening in female socket portion 66 so that groove 55 is aligned with ball or pin receiving recesses 65 and balls or pins 64 therein so that balls or pins 64 can extend into groove 55. Sleeve 62 is then released so as to be biased back to the forward position by spring 63 such that annular flat portion 81 thereof holds retaining balls or pins 64 in ball or pin retaining groove 55 of male connector 31. In such a coupled condition, male and female connectors 31 and 67 are locked together both longitudinally and rotationally with O-rings 61 sealing therebetween. The procedure is reversed to uncouple male and female connectors 31 and 67, without the possible need of rotating since anti-rotation ridge or ridges 52 already align to fit in region 17 in between balls or pins 64.

Figure 4A:
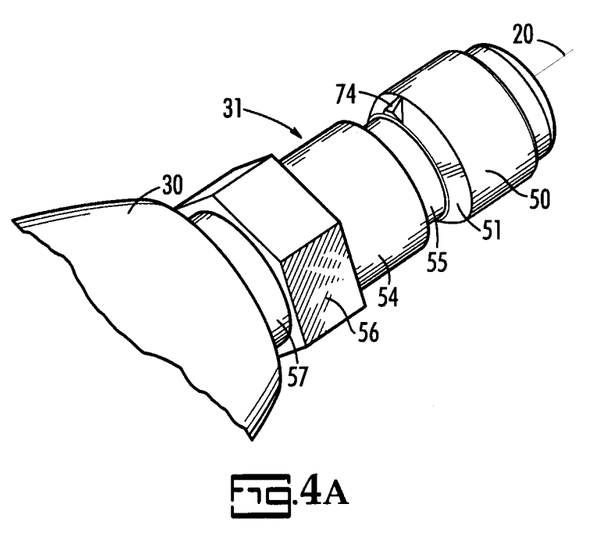
FIG. 4A is a partial perspective view of a male quick connect plug with an alternate embodiment of the ridge located between the ball engagement surface and across toward the backwardly rising surface.
Figure 4B:
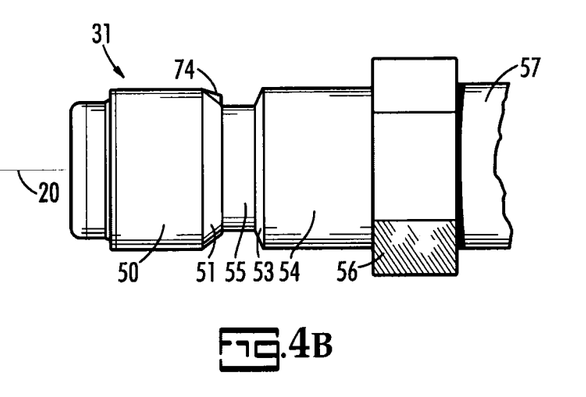
FIG. 4B is a side view of the same male quick connect plug with an alternatively designed ridge.

Another alternate embodiment of anti-rotation ridge 52 is illustrated in FIG. 4A and FIG. 4B where ridge 74 can be one or more longitudinally and radially extending surfaces within groove 55 and retained within forwardly inclined surface 51 and rearwardly inclined surface 53. The ridges 74 may extend all the way across groove 55 and in line with the surface of coupler 50 or the surface of shoulder 54, or may have any number of shapes and sizes that would prevent rotation of retention balls or pins 64 around annular surfaces 53 or 51, or rotation within groove 55.

Figure 5A:
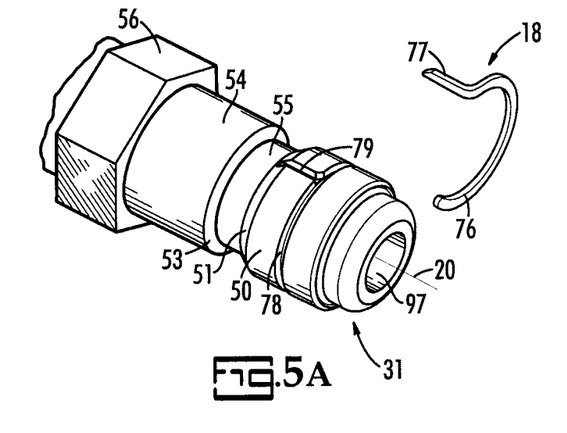
FIG. 5A is an exploded perspective view of an alternative design showing a quick connect plug and an attachable clip.
Figure 5B:
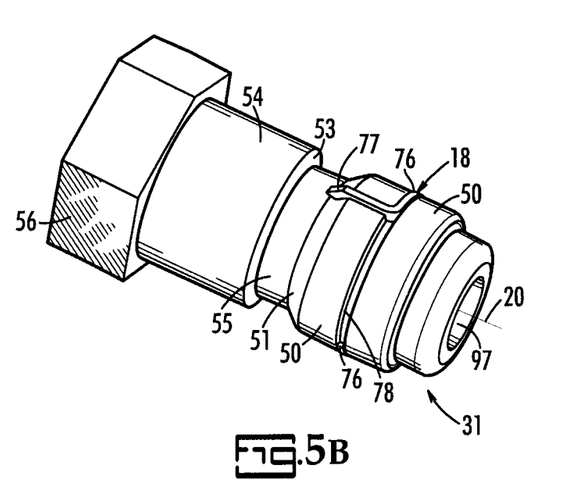
FIG. 5B is a perspective of a clip assembled to a male connect plug.

Another alternate embodiment of anti-rotation ridge 52 is illustrated in FIG. 5A and FIG. 5B where ridge 77 is a separable component clip 18 and attachably held onto the male quick connector 31. Clip 18 would snap into or within grooves 79 and 78 which could also be located in an alternate location of male quick connector 31, for example within shoulder portion 54. Groove 78 on the male quick connector plug would engage segment 76 of clip 18 to retain the clip 18 longitudinally and retain the clip from removal. Groove 79 would engage ridge segment 77 to prevent clip 18 against rotational movement. Ridge segment 77 would protrude into groove region 55 and thus acting in a similar manner as ridge 52 or 74. Anti-rotation clip 18 could be either rigidly connected to male quick connector 31 or may incorporate compliant, non-rigid features in order to be moveably connected to connector 31, but maintain the intended purposes of anti-rotation. The ridges 77 may comprise one or more locations along groove 55.

The method of forming an anti-rotation feature as shown in ridge 52, 74 and 77 may vary in method and design. As an example, the feature could also be threadably attached to the male quick connect plug 31 and act as the anti-rotation ridge itself or retain another such piece to act in the same. The anti-rotation feature may be constructed via various means which include standard machining methods, a separate piece fusably linked as with welding or epoxy, use of electro-discharge machining (EDM), forging, casting, swaging, or other alternate technologies known to manufacturing.

Another alternate embodiment of the anti-rotation ridge would be where the user would physically engage a button or other interface means in order to bias the anti-rotation ridge into position or out of position. In this manner the user would choose when to use the anti-rotation feature or to just allow the system to freely rotate. Examples of ridge actuation would include pivoting or sliding the ridge into position via an interlocking means back to the various interface means available.

Another alternate embodiment of the anti-rotation ridge would be where the anti-rotation feature would be configured not to fully prevent rotation, but instead to provide resistance in the turning process, only to a desired force, and then allow the ridge to release and move past the locking ball. This would result in the ability to provide an audible clicking sound while rotating, as the ridge engages each locking ball. Additionally, the operator would be provided with a resistance feedback that provides physical indication of how much the plug has rotated by counting the number of points of higher resistance.

Another alternate embodiment of the anti-rotation ridge would be where the anti-rotation feature is configured in such a way as to act as a cam surface to the retention balls and thereby gradually influencing the balls radially outward and thus initiating a disconnection of the plug to the coupler. The operator would rotate the nozzle assembly or other mechanism and thereby disengage the coupler socket from the male plug. This is particularly relevant to auto-lock coupler configurations where the user pulls back the retaining collar, and the male plug automatically ejects from the socket via a biasing spring mechanism.

Figure 8:
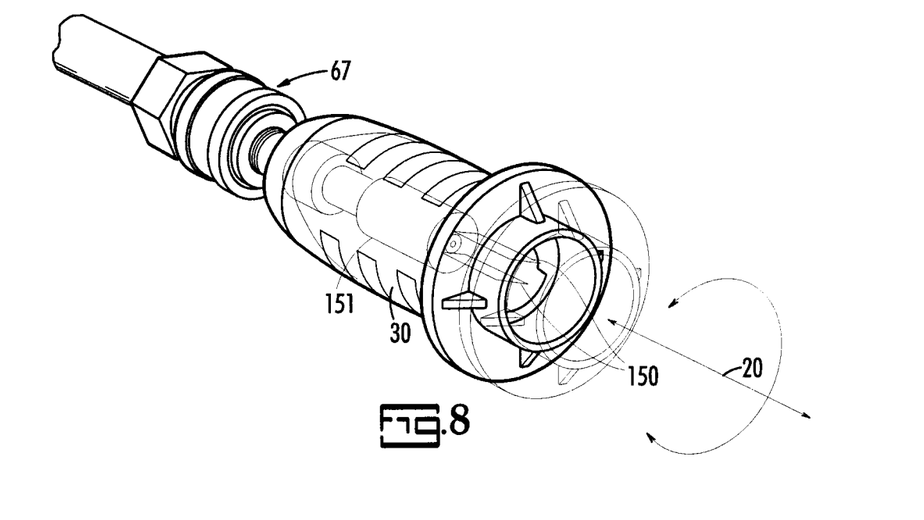
FIG. 8 is an elevated perspective view of a sprayer accessory rotatably adjustable.

A fluid accessory 30 is shown coupled to the female connector 67 via the male connector 31 in FIG. 8. However, other fluid accessories, such as those illustrated in FIG. 10, may be used rather than the fluid accessory in FIG. 8, such as a fixed brush 28, which may be coupled to the female connector 67. The fluid accessory 29 may output a rotating spray pattern, while the fluid accessory 27 may, for example, be configured to output a wide-angle spray pattern, a narrow-angle spray pattern, or any other type of fixed (non-adjustable) spray pattern.

Figure 9:
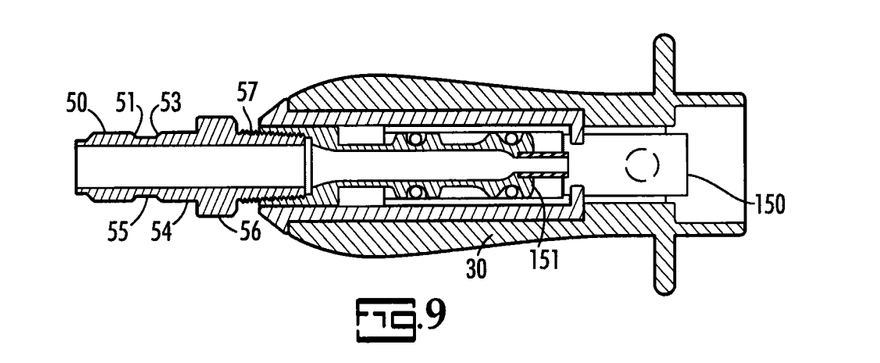
FIG. 9 is a side sectional view of a sprayer accessory threadably attached to male quick connector plug.
Figure 10:
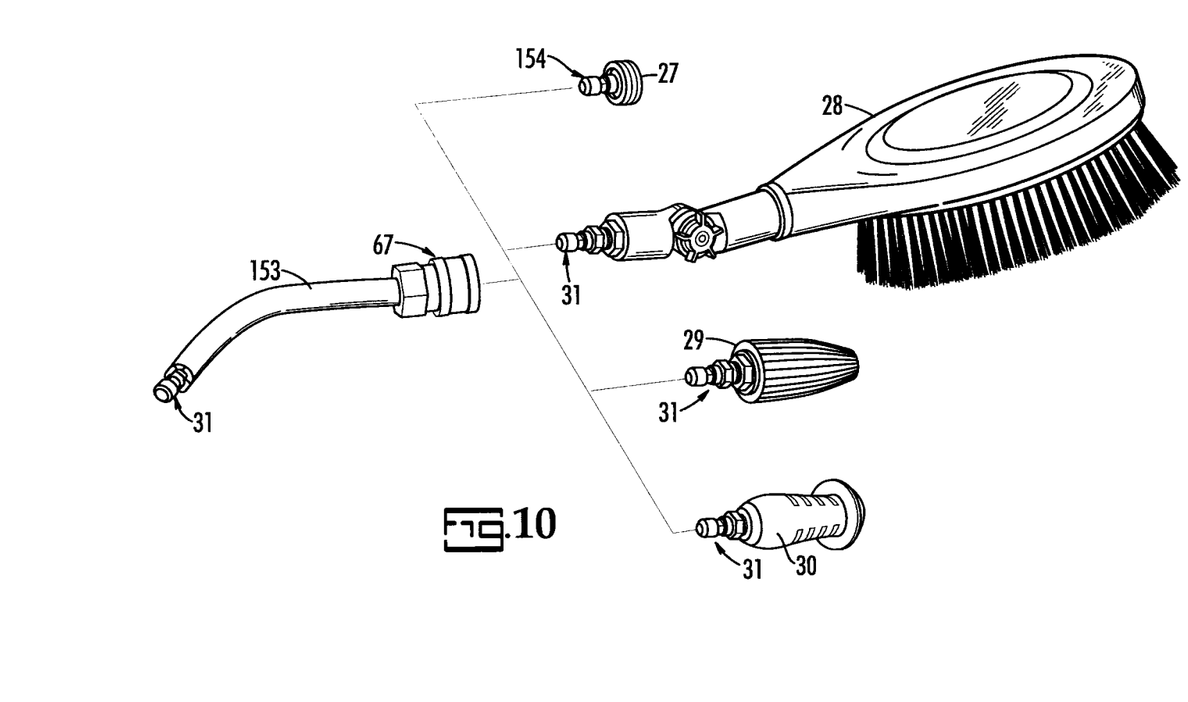
FIG. 10 is an elevated perspective view of multiple sprayer accessories usable with same socket.

In addition, the fluid accessory may be configured to output a different pattern depending on the rotational position selected by the user (nozzle changeover). The adjustable nozzle assembly 30 may be adjusted by the user by axially rotating the housing. For example, the adjustable nozzle 30 housing may be axially rotated about a longitudinal axis 20 between a first position, in which the fluid accessory 30 provides a high pressure spray, and a second position, in which the fluid accessory 30 provides a low pressure spray. Further, the fluid accessory 30 of the illustrated construction includes an independently adjustable mechanism 150 for altering the spray pattern (see FIGS. 8 and 9). The spray pattern may be adjusted by rotating the housing about a longitudinal axis 20, such that at a first rotational orientation, the fluid accessory 30 provides a wide-angle spray pattern, and at a second rotational orientation, the fluid accessory 30 provides a narrow-angle spray pattern. Since the spray pattern is independently adjustable for the nozzle assembly 151, several different combinations of the spray patterns and discharge pressures exist. Nozzle 27 is fitted with a standard male plug 154 to illustrate the backward compatibility of the system. Wand 153 is shown in FIG. 10 to illustrate possible connection configuration.

While illustrated embodiments show, what is known as, a straight-through coupling assembly, the invention would apply to, what is known in the fluid and air flow industry as, one-way shut-off systems as used in compressed air & paint spray applications to name a few. Additionally, the design would apply to, what is known as, double-shutoff systems as commonly associated with use in hydraulics as well as other material such as steam, solvents, cooling water, oil and a host of other media.

The invention also includes the process for connecting a quick connect coupling by using any of the anti-rotation devices disclosed herein.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein.

What is claimed is:

1. A non-rotating coupling system, comprising:
    (a) a male connector (31) extending along a longitudinal axis (20) and having a non-threaded coupling portion (50), a fluid channel (97) extending through said male connector (31), an attachment portion (57) integrally connected to said coupling portion (50) and having an end for attachment to a dispensing accessory (30) with a rotatable component, and an annular groove (55) formed in said non-threaded coupling portion (50), said annular groove (55) including an annular inclined forwardly angled surface (51) and an inclined rearwardly angled surface (53) on a shoulder (54), and said non-threaded coupling portion (50) having at least one ridge (77) extending radially and axially within said annular groove (55);
    (b) a female connector (67) extending along said longitudinal axis (20) and having a fluid channel (71) extending through said female connector (67), a non-threaded female coupling end (66), and plural radial recesses (65) formed in said female coupling end (66);
    (c) a sleeve (62) carried by said female connector (67) for axial movement over said female coupling end (66);
    (d) a spring (63) inserted in said sleeve (62), said spring (63) biasing said sleeve (62) toward a position over said plural radial recesses (65) of said female coupling end (66);
    (e) a plurality of balls (64) arranged to provide at least two adjacent balls with opposing surfaces forming therebetween a region (17) for receiving said at least one ridge (77), said plural balls (64) being positioned within said plural radial recesses (65) of said female coupling end (66) and adjacent to said annular inclined forwardly angled surface (51) within said annular groove (55) of said male coupling portion (50), each ball (64) of said plural balls (64) being carried in one radial recess (65) of said plural radial recesses (65), said sleeve (62) of said female connector (67) maintaining said plural balls (64) within said plural radial recesses (65) in engagement with said annular inclined forwardly angled surface (51), said at least one ridge (77) being received in said region (17) between said opposing surfaces of said at least two adjacent balls (64) of said plural balls (64), and said opposing surfaces being positioned for engagement by said at least one ridge to prevent rotation of said male connector (31) while said dispensing accessory (30) is attached to said attachment portion (57) and said rotatable component is rotated about said longitudinal axis (20),
    wherein said at least one ridge (77) is part of a clip component (18) attachably held on said male coupling portion (50) and has an end for protruding into said annular groove (55), wherein an axially extending body of said ridge (77) fits within an axial groove (79) in said male coupling portion (50), and wherein said clip component (18) includes a clipping segment (76) for fitting within and engaging an annular groove (78) in said male coupling portion (50) to hold said ridge (77) in position, said clipping segment (76) being disengagable from said annular groove (78) to permit removal of said ridge (77) from said male coupling portion (50).

2. The non-rotating coupling system as recited in claim 1, wherein said at least one ridge (77) is integral with said male connector (31).

3. The non-rotating coupling system as recited in claim 1, wherein said at least one ridge (77) extends across said groove (55).

4. The non-rotating coupling system as recited in claim 1, wherein said at least one ridge (77) is removable.

5. The non-rotating coupling system as recited in claim 1, wherein said dispensing accessory (30) is a gas dispensing accessory.

6. The non-rotating coupling system as recited in claim 1, wherein said dispensing accessory (30) is a fluid dispensing accessory.

7. The non-rotating coupling system as recited in claim 1, wherein said dispensing accessory (30) is a sprayer.

8. The non-rotating coupling system as recited in claim 1, wherein said dispensing accessory (30) is a sprinkler head.

9. The non-rotating coupling system as recited in claim 1, wherein the rotatable component of said dispensing accessory (30) is manually rotatable by a user.

10. The non-rotating coupling system as recited in claim 1, wherein the rotatable component of said dispensing accessory (30) is rotatable by impact heads.

11. The non-rotating coupling system as recited in claim 1, wherein said dispensing accessory (30) produces a rotating spray pattern.

12. The non-rotating coupling system as recited in claim 1, wherein said clip (18) is threadably attached to said male plug (50).

13. The non-rotating coupling system as recited in claim 1, wherein said clip is fusably linked to said male plug (50).

* * * * *